US011499648B2

(12) United States Patent
Pávics et al.

(10) Patent No.: US 11,499,648 B2
(45) Date of Patent: Nov. 15, 2022

(54) FLOW CONTROLLED PISTON VALVE

(71) Applicant: KEROX IPARI ÉS KERESKEDELMI KFT., Sóskút (HU)

(72) Inventors: Dániel Pávics, Gödöllő (HU); Tamás Magócsi, Monorierdő (HU); György Bolgár, Budapest (HU)

(73) Assignee: KEROX IPARI ES KERESKEDELMI KFT., Soskut (HU)

( * ) Notice: Subject to any disclaimer, the term of this patent is extended or adjusted under 35 U.S.C. 154(b) by 0 days.

(21) Appl. No.: 17/601,458

(22) PCT Filed: Sep. 10, 2019

(86) PCT No.: PCT/HU2019/050041
§ 371 (c)(1),
(2) Date: Oct. 5, 2021

(87) PCT Pub. No.: WO2020/201782
PCT Pub. Date: Oct. 8, 2020

(65) Prior Publication Data
US 2022/0090696 A1    Mar. 24, 2022

(30) Foreign Application Priority Data

Apr. 5, 2019    (HU) .................................... P1900114

(51) Int. Cl.
*F16K 31/44*    (2006.01)
*F16K 31/383*    (2006.01)
*F16K 31/524*    (2006.01)
*F16K 11/074*    (2006.01)

(52) U.S. Cl.
CPC ............ *F16K 31/383* (2013.01); *F16K 31/44* (2013.01); *F16K 11/074* (2013.01); *F16K 31/524* (2013.01)

(58) Field of Classification Search
CPC ...... F16K 31/383; F16K 31/524; F16K 31/44; F16K 11/074
See application file for complete search history.

(56) References Cited

U.S. PATENT DOCUMENTS

| 807,269 A | * | 12/1905 | Hildebrand | ........... B60T 17/043 |
| | | | | 137/512.2 |
| 2,392,234 A | * | 1/1946 | Downey | ................. F16B 21/18 |
| | | | | 251/360 |

(Continued)

FOREIGN PATENT DOCUMENTS

| DE | 2229612 | 1/1974 |
| FR | 3046653 | 7/2017 |
| JP | 2001098596 | 4/2001 |

OTHER PUBLICATIONS

International Search Report dated Mar. 13, 2020, for PCT/HU2019/050041 filed Sep. 10, 2019, 2 pages.

*Primary Examiner* — Craig M Schneider
*Assistant Examiner* — Christopher D Ballman

(57) ABSTRACT

Piston valve (10) with a hollow housing (13), an inlet (11) and an outlet (12) communicating with the inlet only through the piston valve (10), and a pushbutton (27) that can be moved in and out direction of the housing. A control valve (30) is also arranged in the inner cavity of the housing (13) spaced axially from the valve seat (14), and the opening and closing of the control valve (30) is controlled by the position of the pushbutton.

7 Claims, 5 Drawing Sheets

(56) References Cited

U.S. PATENT DOCUMENTS

| | | | | |
|---|---|---|---|---|
| 2,758,811 A * | 8/1956 | Peterson | F16K 31/363 | 251/38 |
| 2,868,223 A * | 1/1959 | Lum | F16K 41/12 | 137/454.6 |
| 2,927,766 A * | 3/1960 | Orloff | F15B 13/02 | 251/35 |
| 3,308,847 A * | 3/1967 | Umann | F16K 31/404 | 137/613 |
| 3,493,010 A * | 2/1970 | Dreibelbis | F16K 21/16 | 137/454.6 |
| 3,610,571 A * | 10/1971 | Cisco | F16K 31/383 | 251/63.6 |
| 3,667,502 A * | 6/1972 | Otto | F15B 11/15 | 91/416 |
| 3,902,600 A * | 9/1975 | Turner | F16K 31/44 | 137/454.6 |
| 3,972,345 A * | 8/1976 | Court | F04B 49/24 | 137/490 |
| 4,009,860 A | 3/1977 | Lingnau | | |
| 4,073,464 A * | 2/1978 | Hansen | F16K 31/383 | 251/30.02 |
| 4,217,927 A * | 8/1980 | Morita | F16K 17/196 | 137/493.3 |
| 4,275,764 A * | 6/1981 | Baret | G05D 16/0655 | 251/246 |
| 4,481,971 A * | 11/1984 | Farrell | F16K 31/44 | 137/454.6 |
| 4,570,849 A * | 2/1986 | Klaucke | F01P 7/044 | 91/452 |
| 4,576,195 A * | 3/1986 | Dreibelbis | F16K 43/00 | 251/366 |
| 4,633,763 A * | 1/1987 | Manning | B60N 2/914 | 91/530 |
| 4,648,369 A * | 3/1987 | Wannenwetsch | F02M 59/462 | 123/506 |
| 5,378,118 A * | 1/1995 | Phillips | F04C 14/26 | 137/493.4 |
| 5,452,741 A * | 9/1995 | Tomita | G05D 16/107 | 137/116.5 |
| 5,778,925 A * | 7/1998 | Cooke | F02M 55/02 | 137/493.9 |
| 6,286,544 B1 * | 9/2001 | Miyazoe | G05D 16/0658 | 137/505.41 |
| 6,497,247 B1 * | 12/2002 | Kinoshita | F02M 59/462 | 285/305 |
| 6,595,240 B2 * | 7/2003 | Leys | F16K 11/022 | 137/625.5 |
| 6,997,165 B2 * | 2/2006 | Stockner | F02D 11/04 | 137/489.5 |
| 7,017,605 B2 * | 3/2006 | Stroud | F16K 17/105 | 251/360 |
| 7,273,205 B2 * | 9/2007 | Dalmasso | F16K 24/00 | 251/28 |
| 7,451,780 B1 * | 11/2008 | Trimble | F16K 17/0486 | 137/493.5 |
| 7,798,173 B2 * | 9/2010 | Feigel | B60T 8/3665 | 137/630.22 |
| 8,020,833 B2 * | 9/2011 | Sun | A62C 35/02 | 251/30.01 |
| 8,851,107 B2 * | 10/2014 | Risse | G05D 16/0663 | 137/506 |
| 8,910,659 B2 * | 12/2014 | Rub | F16K 31/383 | 137/596.2 |
| 9,072,925 B2 * | 7/2015 | Bermes | A62C 35/68 | |
| 9,574,581 B2 * | 2/2017 | Krug-Kussius | F16K 17/10 | |
| 9,581,228 B2 * | 2/2017 | Nashery | F16K 39/024 | |
| 9,823,669 B2 * | 11/2017 | Schmitz | F16K 31/1221 | |
| 10,018,278 B2 * | 7/2018 | Chuang | E03C 1/02 | |
| 2005/0028869 A1 * | 2/2005 | Roth | F16K 17/196 | 137/493.4 |
| 2006/0112993 A1 * | 6/2006 | Dong | F16K 17/196 | 137/493.6 |
| 2013/0277582 A1 * | 10/2013 | Kang | E02F 9/2267 | 251/89 |

* cited by examiner

FLOW CONTROLLED PISTON VALVE

CROSS-REFERENCE TO RELATED APPLICATIONS

The present invention is a national stage entry of international application no. PCT/HU2019/050041, filed on Sep. 10, 2019, which claims priority to Hungarian patent application no. P1900114, filed on Apr. 5, 2019.

STATEMENT REGARDING FEDERALLY SPONSORED RESEARCH OR DEVELOPMENT

Not applicable.

NAMES OF PARTIES TO A JOINT RESEARCH AGREEMENT

Not applicable.

REFERENCE TO A SEQUENCE LISTING

Not applicable.

STATEMENT REGARDING PRIOR DISCLOSURES BY THE INVENTOR OR A JOINT INVENTOR

Not applicable.

BACKGROUND OF THE INVENTION

The invention relates to a piston valve that has a hollow housing, an inlet provided in the housing, an outlet communicating with the inlet only through the piston valve, and a pushbutton that can be moved in and out direction compared to the housing, wherein the pushed in and pulled out states of the pushbutton set the closed, respectively open states of the piston valve, which comprises furthermore a valve piston arranged in the hollow interior of the housing and guided for displacement along the longitudinal axis, a valve seat provided on an element extending normal to said longitudinal axis, wherein in an extreme position of the valve piston when it is pressed to the valve seat the piston valve is in closed state.

Valves operated by pressure are required in several applications, e.g. when a water flow should be opened or closed easily and quickly and there is no need for adjusting the flow rate. The operation of widely used taps with rotating arm or having only a single arm can be too complex in given applications or in a slippery area where it is not safe or the opening and closing requires certain degree of skill. In other fields, the large size of such taps excludes their use.

Several solutions have been provided for controlling the opening/closing by a pushbutton. One such solution is represented, for example, by DE 10 2009 008 194, in which it can provide, in addition to opening and closing, a branching of an inlet towards a plurality of outlets. In this solution, by pushing a pushbutton, the angular displacement of a ceramic body in several steps can be caused. The ceramic body has a plurality of openings, and under or above the ceramic body there is another different ceramic body also with openings. Based on the relative positions of such openings, the water flow will be opened or closed or led to different outlets.

A fluid opening and closing and branching off by means of the turning of a ceramic disc can be learned in DE 101 37611. The turning takes place in a similar way as the opening and closing of ball point pens, wherein the turning of a shaped element results in the elevated or sunken position of the writing rod of the ball point pen.

In DE2229612, a flushing valve is described in which the pressing of a pushbutton causes the outflow of a predetermined amount of water, wherein there is a main piston valve and a control piston valve arranged so that the time of the flow state is defined by the time required for a bypass flow path to equalize the pressure differences acting on the main piston valve to push the piston of the control valve to close the flow of water. That design cannot be used for a two-state operation in which the water flow is defined by the on or off state of the pushbutton.

In case of classic valves, a piston can be moved above a valve seat in an axial direction and in a pushed state the flow path is broken and in a pulled state the path is open. This operation does not allow that the change from the closed state to the open state and from the open state to the closed state occur by the repeated pushing of the same handling means.

A drawback of mechanically operated piston valves lies in that the transient processes of the closing and opening operations are determined by how handling takes place, and the force required for the operation is also not independent from the pressure of the fluid.

Furthermore, it is also not indifferent that a handling device, e.g. a pushbutton, can perform only the function of opening and closing, without a further constructional design that allows, by utilizing certain further parameters thereof (e.g. by its turning), performance of further important functions (e.g. the mixing of cold and hot water, or the interconnection of an inlet with a plurality of outlets, or the combination of such functions).

In certain applications it may be required that the opening and closing of a flow path takes place with a certain delay compared to the activation of a handling device.

BRIEF SUMMARY OF THE INVENTION

The object of the invention is to provide a piston valve which can enable the control associated with the valve function with the repeated pushing of a pushbutton, and in which the pushbutton is not connected with direct mechanical connection with the piston that directly operates the valve, thus the user cannot influence the transient processes of the opening and closing steps.

A further task of the invention is to ensure that parameters of the handling device of the piston valve (e.g. its turning) other than the pushing be available for performing other functions without influencing the performance of the main function.

A still further task is to provide a piston valve in which the opening and/or closing of the valve takes place with a delay compared to the operation of the pushbutton.

For solving these tasks, a piston valve has been provided comprising a hollow housing with a longitudinal axis, an inlet provided in the housing, an outlet communicating with the inlet only through the piston valve, and a pushbutton that can be moved in and out direction compared to the housing, wherein the pushed in and pulled out states of the pushbutton set the closed respectively open states of the piston valve that comprises furthermore a valve piston with two opposite end faces and arranged in the hollow interior of the housing and guided for displacement along the longitudinal axis, a valve seat provided on an element extending normal to the longitudinal axis, wherein in an extreme position of the valve piston when it is pressed to the valve seat the piston valve is in closed state, and the inlet is led through a passage into the inner cavity of the housing so that in the closed state of the valve piston a lower portion of the valve piston closes said passage, and according to the invention a control valve is arranged in the inner cavity of the housing in a predetermined axial distance from the valve seat and the opening and closing of the control valve is controlled by the position of the pushbutton, and in the interior of the housing between the valve piston and the control valve and intermediate space is formed and the size of the intermediate space depends on the momentary position of the valve piston, and a shunt flow passage is provided between the two end faces of the valve piston providing a small fluid flow, wherein the cross section of the shunt passage is smaller than the flow cross section of the control valve when being in open state, and above the control valve the inner cavity of the housing defines an upper space between the control valve and the pushbutton, a spring is arranged in the upper space that presses the control valve to its closing direction, and in the intermediate space a further spring is arranged that presses the valve piston to take a closed position, and the housing comprises a passage that interconnects the interior space under the valve seat with the upper space, and between the pushbutton and the valve piston there is no mechanical connection, and the pushbutton controls the valve piston only by utilizing the established fluid flow and the associated pressure patterns.

In a preferred embodiment of the piston valve, a radial groove is provided on the outer surface of the valve piston, and a ring made of a resilient material is inserted in the groove, wherein the width and/or depth of the groove is greater than a size of the ring and the so resulting gap constitutes the shunt passage or at least a portion thereof.

In an alternative or complementary embodiment, along the outer mantle of the valve piston at least one axial cut is provided, and this constitutes said shunt passage or at least a portion thereof.

In a further preferred embodiment, a closing body is fixed to the upper part of the housing, and the control valve has a valve seat made in the lower end of the closing body that has a hollow interior constituting said upper space, and the pushbutton is guided and sealed in the closing body, and the control valve is operated by a shaft lead through the upper space and connected to the pushbutton, and the spring that provides bias to the control valve is arranged around the shaft.

In this case, it is preferred if the valve piston comprises an inner nest receiving and supporting an end of the spring, an outer ring is arranged around the inner nest having an upper face, and in the fully open state of the piston valve this upper face abuts the lower end of the closing body (23).

Further function can be realized if the closing body is fixed in the housing in a sealed way which allows its turning around the longitudinal axis.

Further advantages can be attained if the opening and closing of the piston valve is delayed after pushing the pushbutton by means of adjusting the cross section of said shunt passages.

BRIEF DESCRIPTION OF THE SEVERAL VIEWS OF THE DRAWINGS

The piston valve according to the invention will now be described in connection with preferred embodiments thereof, wherein reference will be made to the accompanying drawings. In the drawings.

DETAILED DESCRIPTION OF THE INVENTION

Figure 1:
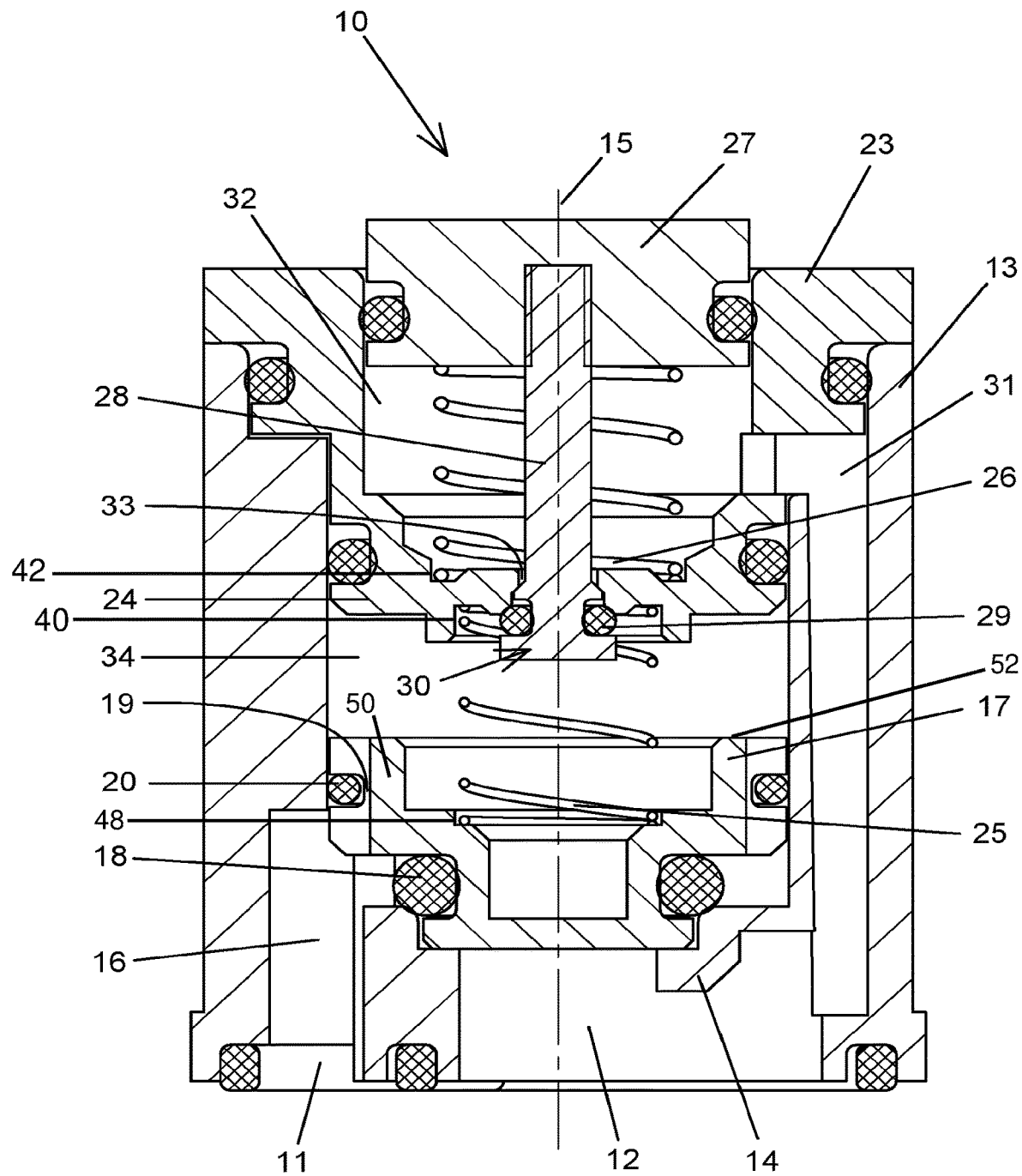
FIG. 1 shows a sectional elevation view of a piston valve according to the invention in a closed position thereof.

FIG. 1 shows the sectional elevation view of a piston valve 10 controlled and designed according to the invention. The piston valve 10 has inlet 11 and outlet 12. The inlet 11 is connected by means of a connection not shown in the drawing to a source of mixed water under pressure, wherein the temperature of the mixed water is determined by the flow rates of the constituting cold and hot water. The outlet 12 can be connected, for example, to a shower head, also not shown in the drawing, which is under normal atmospheric pressure. FIG. 1 shows the piston valve 10 in closed state when there is no fluid passage between the inlet 11 and the outlet 12.

The piston valve 10 has a housing 13 that has a cylindrical hollow body with a valve seat 14 at its lower portion constituted by an asymmetrically designed separation member extending normal to longitudinal axis 15 of the housing 13, and the separation member has a central opening that communicates with the outlet 12. In the interior of the housing 13, at the left side in the view of FIG. 1, a vertical passage 16 is provided which ends above the valve seat 14 and it communicates with the inlet 11.

Figure 5A:
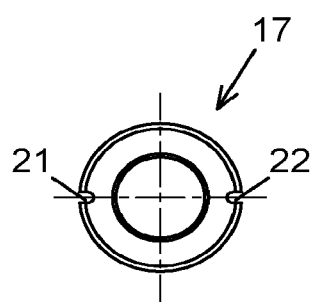
FIGS. 5a, 5b and 5c show a top view, side view, and bottom view of the control valve 17, respectively.
Figure 5B:
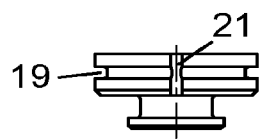
Figure 5C:
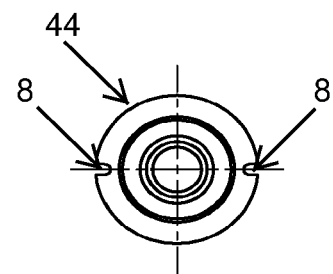

In the interior cavity of the housing 13 in the space above the valve seat 14 a partially closed valve piston 17 is arranged that has a bottom part formed as a cylindrical duct on which a groove is provided for receiving a sealing ring 18. The valve piston 17 has a wider cylindrical upper body portion on which an outwardly open groove 19 is provided in which an O-ring 20 is inserted with a diameter smaller than the size of the groove 19, whereby the valve piston 17 does not provide a sealed separation between the spaces under and above it. It is noted that the design of the valve piston 17 is illustrated in detail in FIGS. 5a, 5b and 5c in which it can be observed that in addition to the imperfectly closing ring 20 a pair of axial cuts 21, 22 are provided in an outer mantle 44 of the valve piston 17 that constitute respective passages with small cross section that act as shunt passages 8 between the two end surfaces of the valve piston 17. In connection with the valve piston 17, the attribute, "partially closed," designates that the two spaces separated thereby are not hermetically closed from each other, but there is a predetermined degree of fluid passage between them.

Reference is made again to FIG. 1, which shows a closing body 23 is attached to the upper side of the housing 13 that has an outer diameter substantially equal to the diameter of the housing 13, and the closing body 23 is designed symmetrically to the longitudinal axis 15 and extends into the inner cavity of the housing 13 following a stepwise narrowing section. The closing body 23 also has a hollow interior with a lower end 24 that hosts respective sunken nests 40 and 42 both under and above the lower end 24. Into the lower nest 40 the upper end of a spring 25 is inserted that provides a bias to the valve piston 17, and into the upper nest 42 the lower end of a spring 26 is arranged that provides a bias for a pushbutton 27. The pushbutton 27 is inserted into the central opening of the closing body 23 and it is guided for axial displacement along the longitudinal axis 15. In the central lower portion of the pushbutton 27 a threaded shaft 28 is fixed. The lower end of the shaft 28 is slightly wider and has an outwardly open circular groove into which a sealing ring 29 is arranged. At the lower end 24 of the closing body 23 a recess is formed with conical lower outer surface. The shaft 28 together with the sealing ring 29 constitutes a control valve 30 and its axial displacement is enabled by the sealed guiding of the pushbutton 27 in the inner bore of the housing 13.

The spring 26 is arranged between the inner surface of the pushbutton 27 and the central part of the upper surface of the lower end 24 of the closing body 23 and presses the pushbutton 27 in upward direction i.e. outward of the housing 13.

The biasing spring 25 is arranged between the lower nest 40 of the end 24 and the valve piston 17 and presses the valve piston 17 in lower direction towards the valve seat 14. The lower end of the spring 25 is kept by a nest 48 formed in the upper face of the valve piston. The nest 48 is surrounded by a cylindrical ring 50 which has an upper face 52 that forms the upper face of the valve piston 17.

In the wall of the housing 13 shown at the right side of FIG. 1 of the drawing, a vertical passage 31 is provided and its lower end communicates with the inner cavity of the housing 13 under the valve seat 14 and in this way with the outlet 12, and its upper end communicates with an upper space 32 defined between the lower surface of the pushbutton 27 and the lower end 24 of the closing body 23. The diameter of the shaft 28 is slightly smaller than an axial bore 33 provided in the central part of the lower end 24 of the closing body 23, therefore in the pushed state of the pushbutton 27 the aforementioned upper space 32 communicates with an intermediate space 34 formed between the lower end 24 of the closing body 23 and the valve piston 17.

The operation of the piston valve according to the invention is as follows.

In the position shown in FIG. 1 the piston valve 17 is pressed by the biasing spring 25 to the valve seat 14, and the valve is sealed by the sealing ring 18. The pressure in the intermediate space 34 is the same pressure what is present at the inlet 11 which is higher than the atmospheric one. In the upper space 32 there is only atmospheric pressure because now the control valve 30 is in closed state (the pushbutton 27 is in its upper position), i.e. the pressures in the intermediate space 34 differs from that prevailing in the upper space 32. The atmospheric pressure in the upper space 32 is caused through the passage 31 because at the lower end thereof the communication with the outlet 12 ensures this atmospheric pressure. In this position the overpressure prevailing in the intermediate space 34 acts on the lowermost surface of the shaft 28, whereby this pressure is higher than the bias provided on the control valve 30 by the spring 26, and the control valve 30 is pressed to its own valve seat 46 and remains closed. The same overpressure also acts on the upper end of the valve piston 17 and in addition to the pressure provided by the spring 25 presses the same to its own valve seat 14.

Figure 2:
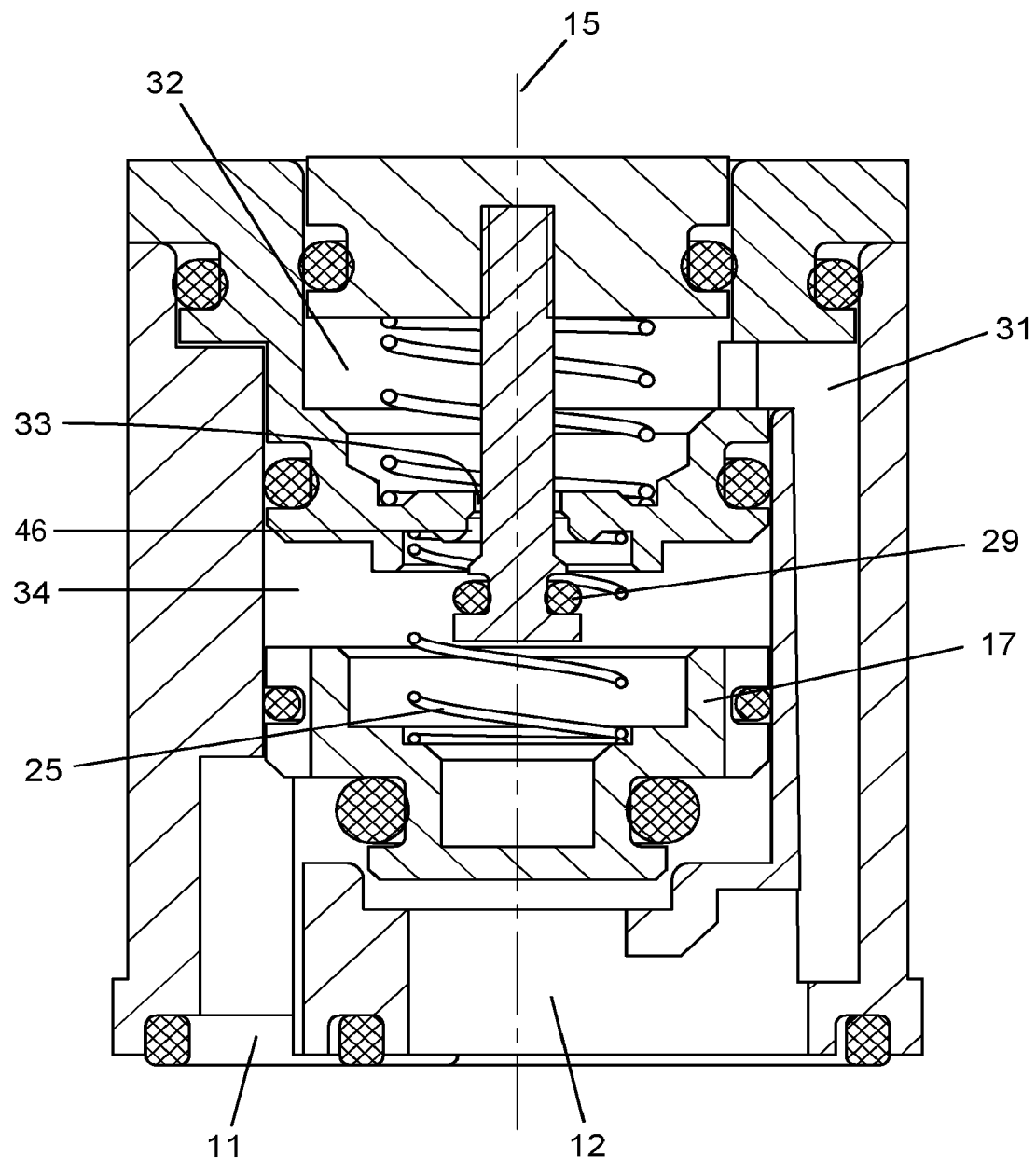
FIG. 2 is a sectional elevation view similar to FIG. 1 that shows the valve in an initial phase of its opening.

Reference is made now to FIG. 2 in which the pushbutton 27 is shown in pressed position, i.e. its upper end falls in the upper plane of the closing body 23 and the control valve 30 is in open state because the sealing ring 29 is moved away from its valve seat with inclined surface. When the control valve 30 is opened, a fluid passage opens between the intermediate space 34 and the upper space 32 through the axial bore 33 and owing to the fact that in the upper space 32 there is only a low (atmospheric) pressure, the fluid with overpressure will flow through the open bore 33 in the upper space 32 and the pressure in the intermediate space 34 will decrease. The pressure difference between the lower and upper surfaces of the valve piston 17 will push and move the valve piston 17 in upward direction along the longitudinal axis 15 against the biasing force of the spring 25, whereby under the valve piston 17 a passage will open for the mixed water towards the outlet 12, and that pressure will present itself through the passage 31 also in the upper space 32.

Figure 3:
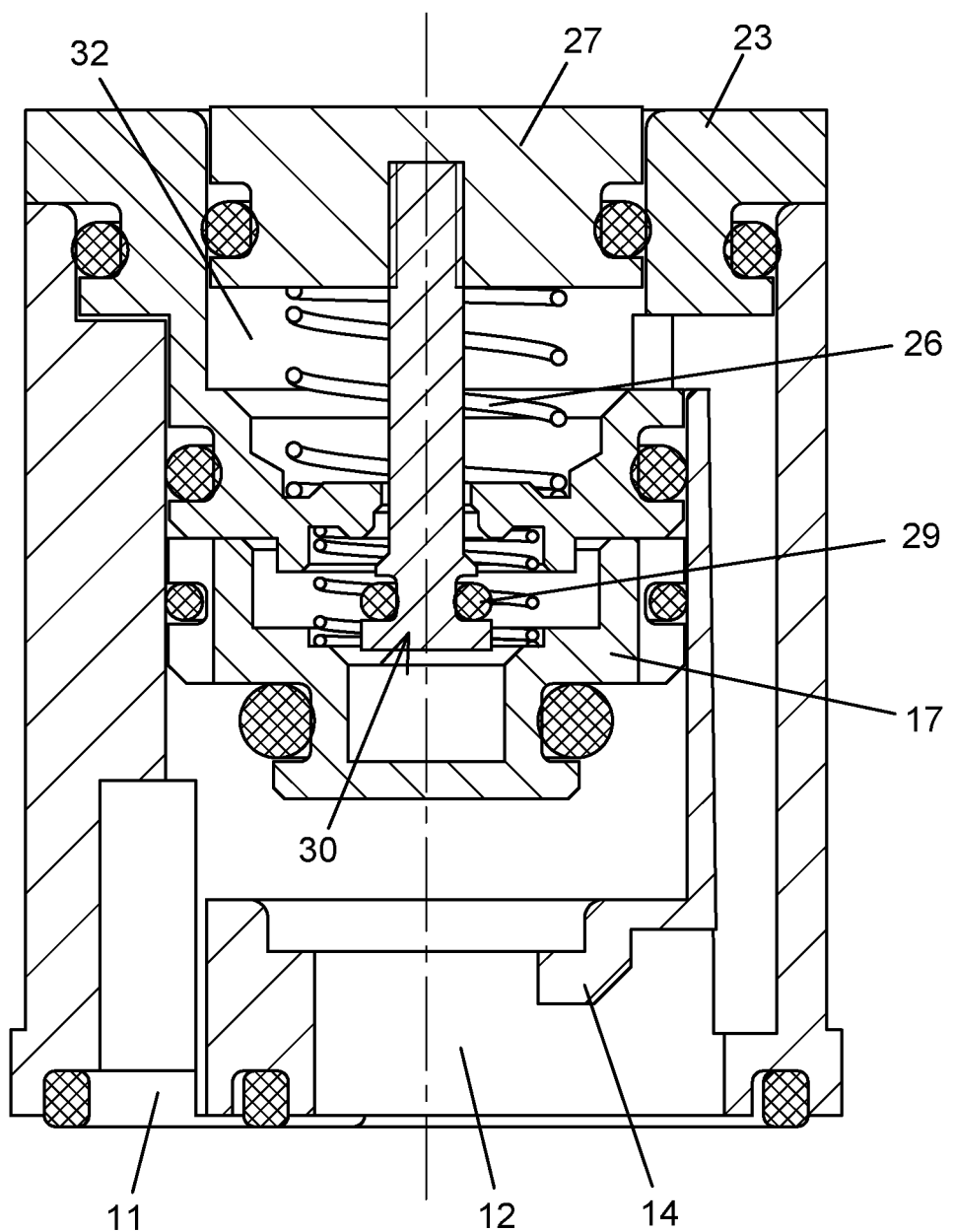
FIG. 3 is a sectional elevation view similar to FIG. 1 that shows the valve in an open state of the valve.

As a consequence of the described pressure distribution the valve piston 17 will move in upward direction till its abutment, which state is shown in FIG. 3. The upper face of the valve piston 17, which is formed by the previously mentioned cylindrical ring 50, abuts the lower surface of the lower end 24 of the closing body 23 and the volume of the intermediate space 34 decreases to minimum. The shunt path between the lower and upper faces of the valve piston 17 gets substantially decreased. The pressure of the fluid flowing from the inlet 11 presses the valve piston 17 in upper direction against the biasing force of the spring 25 and a free flow path is provided between the inlet 11 and the outlet 12. The pressure in the upper space 32 corresponds substantially to that at the outlet 12. The pressure difference between the two opposite faces of the valve piston 17 keeps it in the open position shown in FIG. 3.

Figure 4:
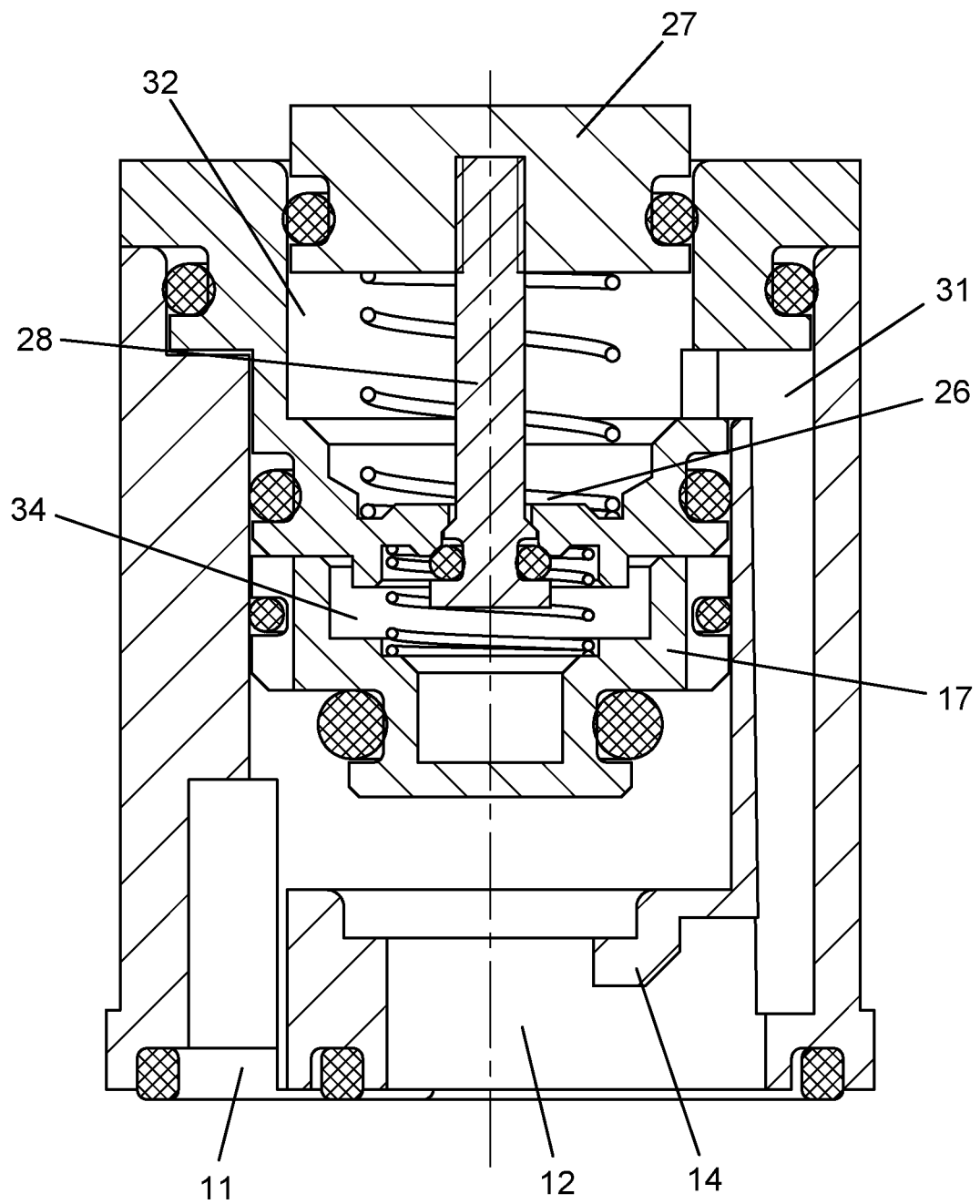
FIG. 4 is a sectional elevation view similar to FIG. 1 that shows the valve in an initial phase of closing the valve.

This free flow path can be closed by the lifting of the pushbutton 27. Then the control valve 30 takes the closed position shown in FIG. 4. By the closure of the control valve 30 the flow path between the upper space 32 and the intermediate space 34 (decreased to minimum) above the valve piston 17 gets broken. The increased pressure under the valve piston 17 forces the fluid to flow into the intermediate space 34, whereby the pressure difference between the upper and lower faces of the valve piston 17 decreases to zero and the biasing force of the spring 25 pushes the valve piston 17 in downward direction until it reaches to position shown in FIG. 1. Then the fluid path gets broken between the inlet 11 and the outlet 12 and the valve closes. In the upper space 32 again the atmospheric pressure will prevail through the passage 31.

At this design if the pressure at the inlet 11 disappears due to any reason, the spring 25 will push the valve piston 17 into the lowermost position at which the valve gets closed, and the spring 26 will similarly close the control valve 30. In this way if in the water supply system any problem takes place and the overpressure disappears, the fully closed state will be automatically taken, and when the pressure returns, flow can commence only after the pushbutton 27 has been intentionally pushed again.

A characteristic property of the solution according to the invention lies in that there is no kind of direct mechanical connection between the pushbutton 27 with the valve piston 17 which opens and closes the main flow path, because the valve piston 17 is moved exclusively by the flow and pressure distribution pattern provided together with the effects of the biasing springs 25, 26. The speed of the opening and closing transient processes can be controlled in a fine way by the design of the shunt passages 8, i.e. the decreased outer sealing of the valve piston 17 and the size of the cuts 21, 22 and the cross section and length of the passage 31.

A specialty of this solution lies in that the cross section of the flow path between the two opposite faces of the valve piston 17 is determined first by the cross section of the cut 21, 22 and the play between the groove 19 and the ring 20.

If the cross section of these passages is changed, i.e. decreased, then fluid can flow only slower between the two opposite faces and the previously mentioned pressure equalization requires a longer time which causes delay in the closing and opening of the valve. There can be field of application in which the start of water flow occurs only with a delay after the pushbutton 27 has been pressed. The extent of the delay can be adjusted by the change of the aforementioned cross sections of the shunt paths.

A further characteristic of the embodiment described lies in that the operation of the valve does not require the turning of either the pushbutton 27 or of the closing body 23. Therefore, the relative angular position of these elements can be fixed, which provides room and possibility for further control functions. The closing body 23 is therefore arranged in a sealed way in the housing 13 but it can be turned around the axis 15. Of course, the possibility of the turning is also provided if the relative angular position of the housing 13 and the closing body 23 is fixed, and in that case the housing 13 and the closing body 23 can be turned together.

The invention claimed is:

1. A piston valve (10) comprising:
   an elongated housing (13) with a hollow interior and a longitudinal axis (15), an inlet (11) provided in the housing (13) at a first end thereof, an outlet (12) provided laterally beside the inlet at said first end of the housing, and a pushbutton (27) arranged at a second end of the housing longitudinally opposite to the first end, the pushbutton longitudinally moveable in both an in and an out direction relative to the housing (13) between two extreme positions;
   a valve piston (17), having two opposite end faces, arranged in the hollow interior of the housing (13) and guided for displacement along said longitudinal axis (15);
   a valve seat (14) for said valve piston (17) provided in the hollow interior defining an end of said displacement toward said first end, wherein the valve seat (14) communicates with the outlet (12), and wherein, when the valve piston (17) is pressed to the valve seat (14), fluid passage through the valve piston (17) is closed, and the inlet (11) is led through a passage (16) extending through said housing (13) arranged laterally to said hollow interior in which said valve piston (17) is guided, said passage (16) communicates with the hollow interior just above the valve seat (14) so that the passage (16) is closed in a closed state of the valve piston (17);
   a control valve (30) having a shaft (28) oriented parallel to the longitudinal axis and arranged in said hollow interior of the housing (13) in a predetermined axial distance from the valve seat (14), the control valve (30) attached to the pushbutton (27) via the shaft, wherein opening and closing of the control valve is controlled by the position of the pushbutton that causes axial displacement of the shaft;
   an intermediate space (34) formed in the housing (13) between the valve piston (17) and the control valve (30), wherein the size of the intermediate space (34) depends on the position of the valve piston (17);
   a shunt flow passage (8) provided along an outer surface (44) of the valve piston (17) and between the two end faces of the valve piston, wherein a cross section of the shunt passage is smaller than a flow cross section of said control valve (30) when opened, the shunt flow passage causing a delayed displacement of the valve piston (17) relative to a change of state of said pushbutton (27);
   an upper space (32) in the hollow interior of the housing (13) defined between the control valve (30) and the pushbutton (27);
   a first spring (26) arranged in the upper space (32) that moves the control valve (30) to a valve closed position; and
   a second spring (25) arranged in the intermediate space (34) that moves the valve piston (17) to a piston closed position,
   wherein an interior passage (31) extending through said housing provides continuous communication between the outlet (12) and the upper space (32), and the position of the pushbutton (27) controls respectively an open state and a closed state of the piston valve (10) by utilizing established fluid flow and associated pressure patterns.

2. The piston valve of claim 1, wherein a radial groove (19) is provided along an outer surface of the valve piston (17) and a ring (20) made of a resilient material is inserted in the groove (19), wherein the width and/or depth of the groove is greater than the size of the ring (20) and the groove constitutes the shunt flow passage (8) or at least a portion thereof.

3. The piston valve of claim 1, wherein at least one axial cut (21, 22) is provided along the outer surface (44) of the valve piston (17), wherein the at least one axial cut constitutes said shunt flow passage (8) or at least a portion thereof.

4. The piston valve of claim 1, wherein a closing body (23) is fixed to the second end of the housing (13), the closing body extending into the hollow interior of the housing, defining the upper space (32), and having a valve seat (46) formed in a lower end (24) of the closing body (23), wherein the control valve (30) is arranged in an interior of the closing body (23), the pushbutton is guided and sealed in the closing body (23), said shaft (28) is lead through the upper space (32) and connected to the pushbutton (27), and the first spring (26) biasing the control valve (30) is arranged around the shaft (28).

5. The piston valve of claim 4, wherein the valve piston (17) further comprises a nest (48) receiving and supporting a lower end of the second spring (25), an outer ring (50) arranged around the nest and having an upper face (52), wherein the upper face abuts the lower end (24) of the closing body (23) in the open state of the piston valve (10).

6. The piston valve of claim 4, wherein the closing body (23) is fixed in the housing (13) in a sealed way which allows the turning of the housing (13) around the longitudinal axis (15).

7. The piston valve of claim 1, wherein the delayed displacement of the valve piston (17) relative to the change of the state of said pushbutton (27) can be adjusted by changing the cross section of said shunt flow passages.

* * * * *